United States Patent [19]
Grady et al.

[11] Patent Number: 5,604,478
[45] Date of Patent: Feb. 18, 1997

[54] PET OPERABLE DOOR CHIME

[75] Inventors: Tamara L. Grady, 11173 Bridalwood Trail, Berrien Springs, Mich. 49103; Andrew Krochmal, Stevensville, Mich.

[73] Assignee: Tamara L. Grady, Berrien Springs, Mich.

[21] Appl. No.: 398,741

[22] Filed: Mar. 6, 1995

[51] Int. Cl.⁶ ............................................. G08B 21/00
[52] U.S. Cl. .................. 340/330; 340/286.11; 340/328; 340/539; 340/573; 119/174
[58] Field of Search ............................ 340/330, 573, 340/539, 286.11, 328; 119/174

[56] References Cited

U.S. PATENT DOCUMENTS

| | | | |
|---|---|---|---|
| 3,599,606 | 8/1971 | Hayward | 119/29 |
| 3,656,141 | 4/1972 | Hill | 340/573 |
| 3,702,999 | 11/1972 | Gradisar | 340/573 |
| 3,938,120 | 2/1976 | O'Connell | 340/545 |
| 4,131,887 | 12/1978 | Birkenhead | 340/566 |
| 4,258,359 | 3/1981 | McLamb | 340/546 |
| 4,263,586 | 4/1981 | Nicholas | 340/568 |
| 4,323,883 | 4/1982 | Sowards | 340/328 |
| 4,400,696 | 8/1983 | Klingensmith | 340/573 |
| 4,414,921 | 11/1983 | Cozzi | 119/29 |
| 4,506,257 | 3/1985 | Roberts, Sr. | 340/521 |
| 4,551,713 | 11/1985 | Aossey | 340/666 |
| 4,686,504 | 8/1987 | German | 340/573 |
| 4,808,974 | 2/1989 | Cantley | 340/546 |
| 4,908,484 | 3/1990 | Gunoff | 200/331 |
| 4,924,214 | 5/1990 | Hill | 340/666 |
| 5,038,703 | 8/1991 | Frush | 116/170 |
| 5,303,677 | 4/1994 | Jones | 340/286.11 |
| 5,327,796 | 7/1994 | Ernst et al. | 74/489.11 |
| 5,365,214 | 11/1994 | Angott et al. | 340/328 |
| 5,475,369 | 12/1995 | Baker | 340/573 |

OTHER PUBLICATIONS

Nov. 1994 DAMARK® International, Inc. Catalog, Advertisement for "SMART-MAT Monitoring System", p. 8.

*Primary Examiner*—Jeffery Hofsass
*Assistant Examiner*—Edward Lefkowitz
*Attorney, Agent, or Firm*—Lynn Fiorito Watts

[57] ABSTRACT

A portable chime system that is operable by a pet to alert the pet owner that the pet desires something such as to be let in or out of a building. The chime system includes a switch unit that may be placed on the ground or floor near a door and which may be activated by a pet applying pressure to the top of the unit. The switch unit is designed to avoid misfiring or nonfiring. The chime system also includes a remote chime unit that can be positioned in a different room or area than the switch unit. When the pet activates the switch unit, the switch unit sends a signal to the chime unit to sound a chime located within the chime unit.

17 Claims, 3 Drawing Sheets

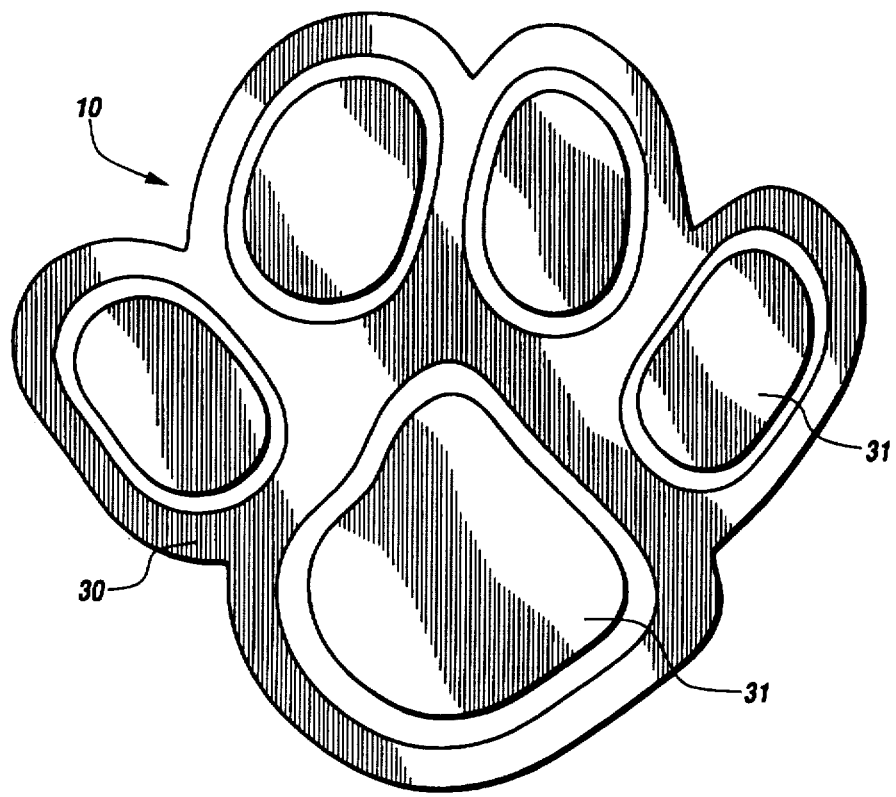
Fig.5
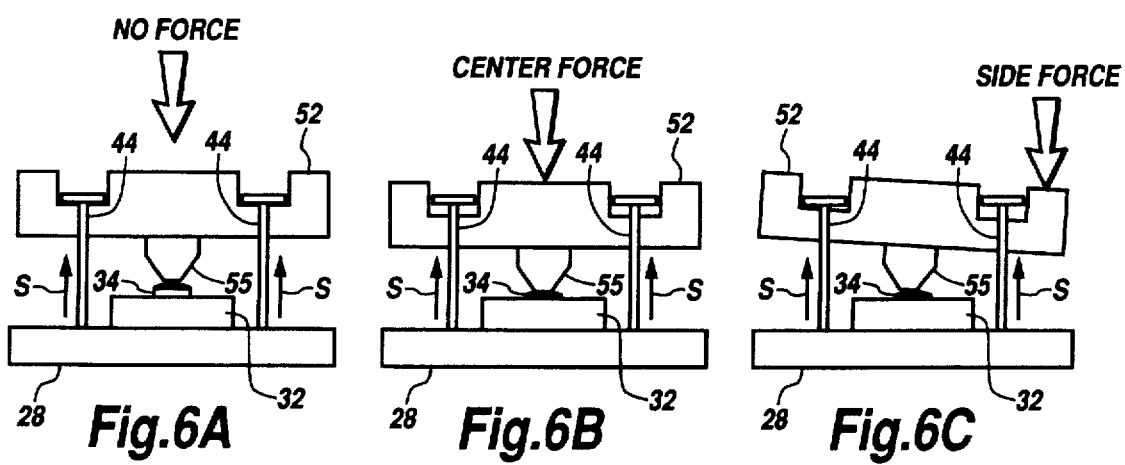
Fig.6A  Fig.6B  Fig.6C

PET OPERABLE DOOR CHIME

BACKGROUND OF THE INVENTION

The present invention relates to a door chime and, in particular, a door chime designed to be activated by a pet animal in order to alert the owner that the pet wishes to leave or enter a house or other building.

Often when a pet animal, such as a pet dog, wishes to be let out of or into a house, it may either stand silently by the door waiting for the owner to come by and open the door or it may bark or even scratch at the door. Where the dog merely waits silently at the door, it may wait a period of long time before the owner happens to come by and see the dog. Even if the dog does bark, the owner may not be near enough to hear the dog, or the owner may hear the dog but may confuse the barking with other barking the dog may do if the dog tends to bark a lot. Or, the owner may find the barking to be annoying to others. The scratching of the door clearly is undesirable as it can cause damage to the door.

Several devices have been proposed that may be used by a pet in order to alert the owner that it desires to have a door opened. These devices are typically mounted to the door and include some type of alarm that is activated by the pet. Because the alarm is internal to the device, it may not be heard by the owner if the owner is in a remote part of the house. In addition, with some of the devices, considerable defacing of the door is required in order to mount the device to the door. Furthermore, because these devices are mounted to the door, the pet may cause damage to the door as it attempts to activate the device.

The present invention, therefore, provides a pet-activated chime system that is portable and easily activated by a pet. The chime is not mounted to the door and hence neither the mounting of the chime or the pet will cause damage to the door. In addition, the invention provides a chime unit that is remote from a switch unit that is activated by the pet. The chime unit can, therefore, be moved to a location where the owner of the pet can hear the chime unit sound when the pet activates the switch unit.

SUMMARY OF THE INVENTION

The present invention provides a pet-operable chime system that includes a portable switch unit and a remote chime unit. The switch unit comprises a base stand and a movable plate that is spaced from said base stand. The movable plate is provided with three through holes that are substantially positioned at the vertices of an imaginary equilateral triangle. The switch unit timber comprises a transmitter for transmitting radio frequency signals and a switch electrically coupled to the transmitter. The switch is mounted to either the base stand or the movable plate at a location that is substantially aligned with the center of the imaginary equilateral triangle.

An actuation member is attached to the other of the base plate or movable plate that does not support the switch. The actuation member is positioned at a location that is substantially opposite the switch and, therefore, is also substantially aligned with the center of the imaginary triangle.

Three posts interconnect the movable plate and the base plate. Each post has a first end and an opposing second end that is provided with a bolt head that is wider in diameter than the post. The first end of each the post is fixed to the base plate, and the second end of each post is freely inserted through a respective one of the through holes of the movable plate such that the movable plate is free to slide along the posts. The through holes each have a first portion that is slightly larger than the diameter of the post and a second portion that is slightly larger than the bolt head and receives the bolt head.

Three spiral springs encircle respective posts and also interconnect the movable plate and the base plate. The springs are biased to push the movable plate away from the base plate. An outer shell in the shape of a pet's paw covers the top and most of the side of the switch unit.

The remote chime unit comprises a receiver for receiving signals from the transmitter and a chime electrically coupled to the receiver for generating an audible sound. The remote chime unit may be plugged into an electrical outlet or may be provided with its own battery.

The movable plate is movable between a neutral position, where no pressure is applied to the movable plate and the actuation member does not engage the switch, and an activated position, where under pressure the movable plate is moved toward the base plate against the bias of the springs such that the actuation member engages and activates the switch. The activated switch causes the transmitter to send a signal to the remote chime unit to sound the chime. The movable plate may be moved to its actuation position by a pet applying pressure to the top of the outer shell.

BRIEF DESCRIPTION OF THE DRAWINGS

The above and other objects and advantages of the invention will become apparent from consideration of the following detailed description when read in conjunction with the accompanying drawings, in which like reference characters refer to like parts throughout, and in which:

FIG. 5 is a top view of the cover plate of the pet-activated switch unit of FIG. 1; and FIGS. 6A, 6B, and 6C are a series of force diagrams illustrating schematically three different applications of force applied to the pet-activated switch unit of FIG. 1; in particular:

FIG. 6A is a schematic force diagram illustrating the forces involved when no external force is applied to the switch unit, FIG. 6B is a schematic force diagram illustrating the forces involved when a center external force is applied to the switch unit, and FIG. 6C is a schematic force diagram illustrating the forces involved when a side force is applied to the switch unit.

DETAILED DESCRIPTION OF THE INVENTION

The present invention provides a pet chime system that is portable and can be activated by a pet to sound a chime in a remote part of a house or building if desired. For ease in describing the invention, the pet chime system is described herein as being used by a dog. However, the pet chime system may be sized to be used by cats, birds, or other animals if desired and can be used by the pet to alert the owner of other things such as the pet's desire to be fed, if the device is placed near where the pet normally eats.

Figure 1:
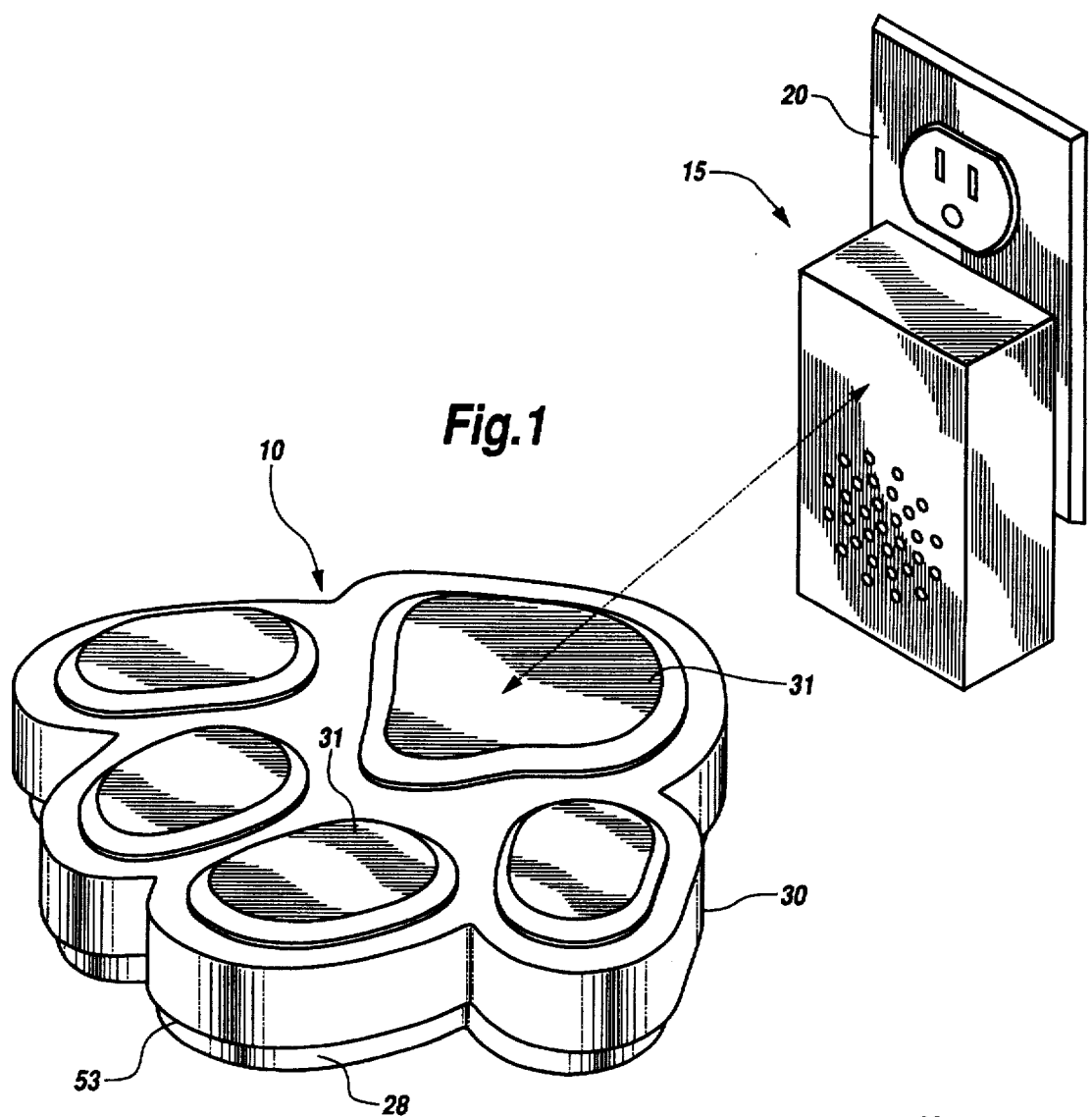
FIG. 1 is a perspective view of a pet chime system that includes a pet-activated switch unit and a chime unit, in accordance with the present invention.

With reference to FIG. 1, the pet chime system includes a pet-activated switch unit 10 and a chime unit 15 that may positioned remotely from the switch unit 10. When in use, the switch unit 10 is placed on the ground where, as explained in more detail below, the unit may be activated by a dog depressing the top of the unit 10. When activated, the switch unit 10 transmits a signal by radio frequency to the chime unit 15 to sound a chime located within the chime unit 15.

Figure 2:
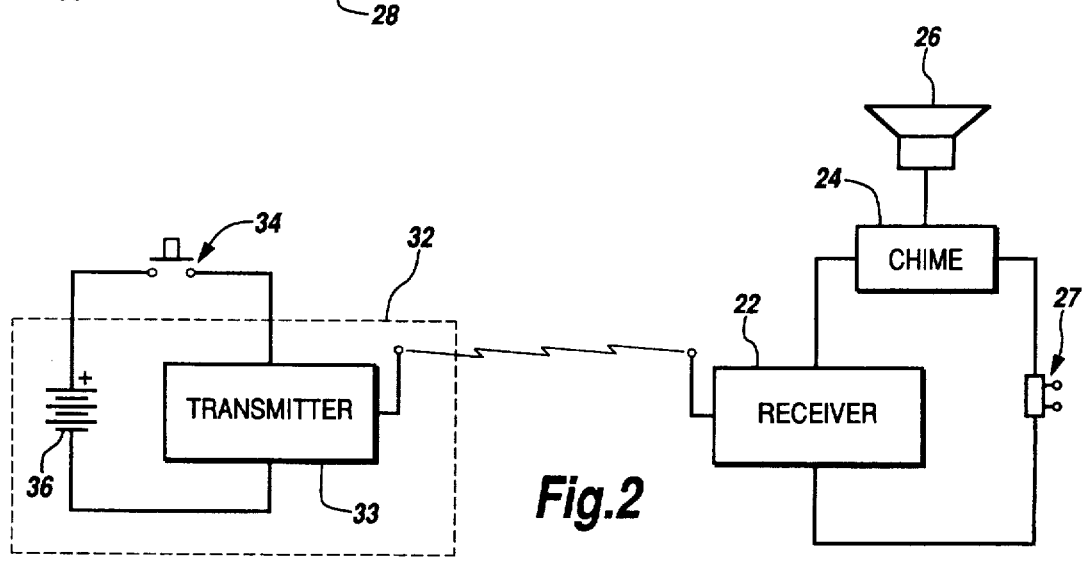
FIG. 2 is a schematic view of the pet chime system of FIG. 1.

The chime unit 15 is preferably a conventional receiver module that may be plugged into an electrical outlet 20 when in use. Alternatively, the receiver could be battery-operated so that the chime unit may be used outdoors or elsewhere where an electrical outlet may not be available. With reference to FIG. 2, the receiver module 15 comprises a receiver 22 for receiving the radio signals from the switch unit 10, an electronic chime 24 and speaker 26 for producing an audible chime signal, and a pair of prongs 27 for plugging the module 15 into the electrical socket.

Figure 3:
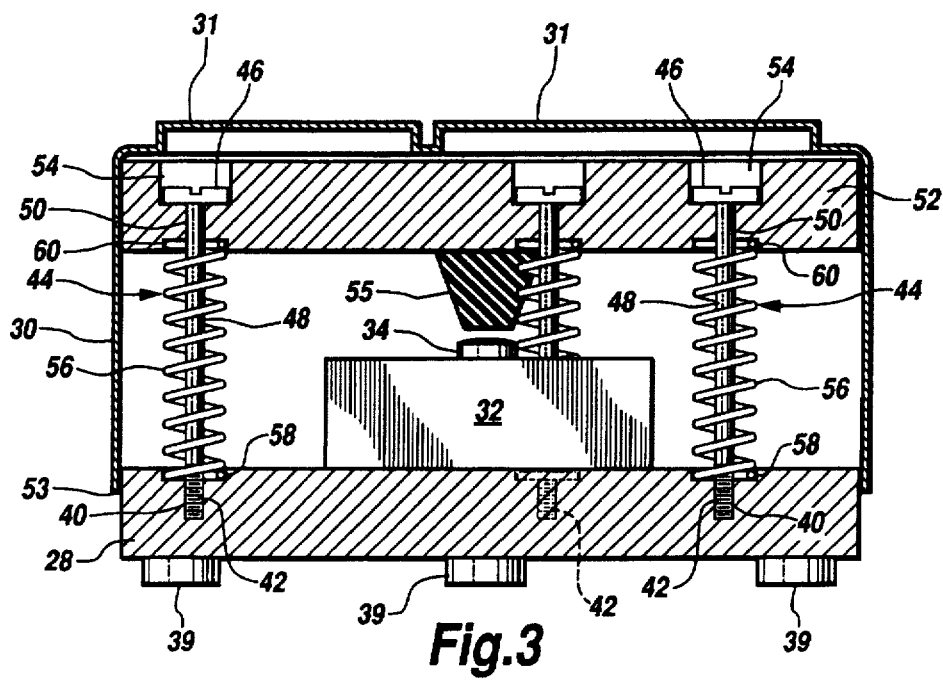
FIG. 3 is a side cross-sectional view of the pet-activated switch unit of FIG. 1.
Figure 4:
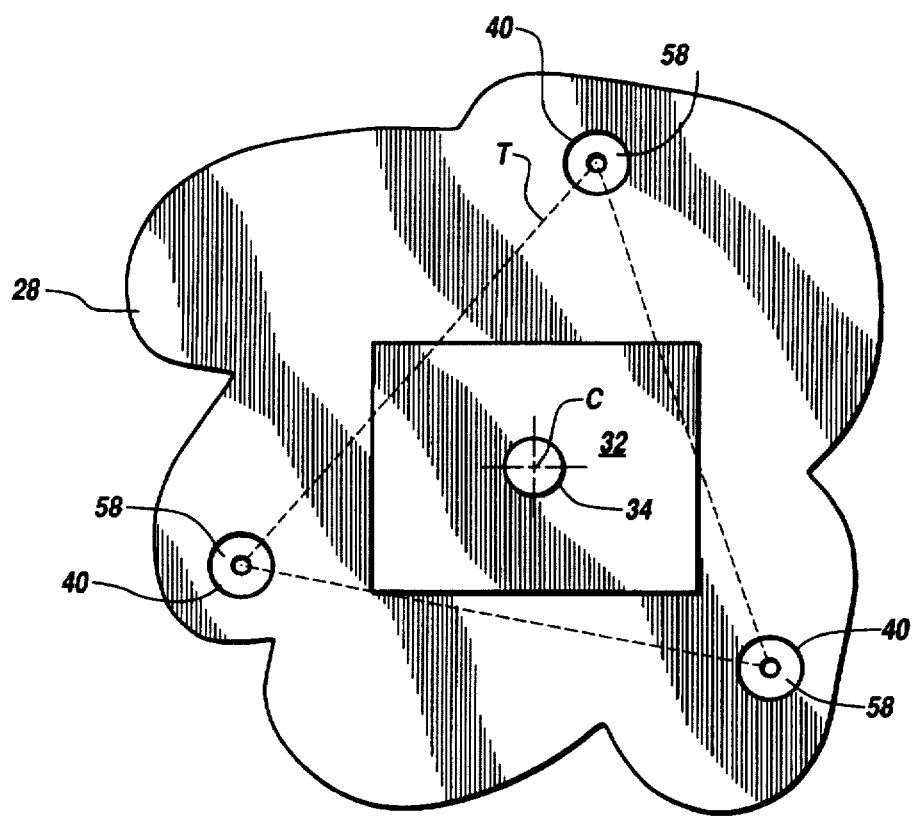
FIG. 4 is a top view of the base plate and transmitter module of the pet-activated switch unit of FIG. 1.

Referring to FIGS. 2, 3, and 4, the pet-activated switch unit 10 comprises a base plate 28 and an outer shell 30 both of which preferably are in the shape of a dog's paw as viewed from above. The outer shell 30 is preferably vacuum formed from plastic in a known manner. The outer shell 30 includes raised sections 31 that represent the pads of a dog's paw and provide more of a three-dimensional effect.

Mounted to the top of the base plate 28 is a conventional transmitter module 32 that is compatible with the receiver module 15. The transmitter module 32 is equipped with a transmitter 33, micro-switch 34, and battery 36. The micro-switch 34 is biased so that when it is not activated, i.e., not depressed, it is an open switch. Examples of suitable transmitter module and receiver module systems that can be employed include standard wireless chime model Nos. RC3700A, RC3700B, RC3150C, RC3101C or D, and RC3100C or D available from Dimango Products of Brighton, Mich. As explained in more detail below, when the transmitter module 32 is activated or depressed, it sends a signal to the receiver module 15 to sound a chime.

The base plate 28 preferably is made of metal or some other suitable material or combination of materials that adds weight to the plate so that the switch unit 10 will remain in place when in use. Nonskid pads may also be fastened to the bottom of the base plate 28 to further assist in keeping the switch unit 10 in place.

With particular reference to FIG. 4, the base plate 28 includes three holes 40 that are located at the three vertices of an imaginary equilateral triangle represented by dotted lines T. In this manner, the three holes 40 are equidistant from one another. Preferably, the holes 40 are positioned as close to the outer edge of the base plate 28 as possible. In addition, the transmitter module 32 with the micro-switch 34 is positioned on the base plate 28 so that the micro-switch 34 is located at the center C of the imaginary equilateral triangle T. The center C is defined as the intersection of the angle bisectors of the imaginary equilateral triangle T.

Referring back to FIG. 3, each of the holes 40 of the base plate 28 fixedly receives one end 42 of a respective support post 44. In the embodiment shown, the support posts 44 are shown threaded into the holes 40. Other manners, however, of fixing the support posts 44 in the holes 40 may employed.

Preferably, the support posts 44 are elongated bolts comprising a bolt head 46 and a shaft 48 that is smooth at least near the bolt head 46. The support post ends with the bolt heads 46 are received in respective holes 50 provided in an upper plate 52 that is vertically spaced from the base plate 28. The holes 50 of the upper plate 52 preferably are slightly larger than the diameters of the support posts 44. On the top side of the upper plate, the holes 50 are provided with relatively deep counter bores 54 that accommodate the bolt heads 46.

The upper plate 52 is preferably made of plastic and is in the same shape of a dog's paw as viewed from above as is the base plate 28 and outer shell 30. The outer shell 30 covers the top of the upper plate 52, curves around the sides of the upper plate 52, and extends downward to the base plate 28. When the switch unit 10 is in its inactive or resting position, the bottom edge 53 of the outer shell 30 does not reach the very bottom of the unit 10. Rather, the bottom edge 53 is spaced from the bottom of the unit 10 so that a gap is formed therebetween. Preferably, the gap is large enough so that when the switch unit 10 is activated, as explained in more detail below, the bottom edge 53 of the outer shell 30 will not hit the ground or floor on which the switch unit 10 is resting.

The three holes 50 of the upper plate 52 are spaced from each other the same distances as the holes 40 of the base plate 28. In other words, the holes 50 are positioned at the vertices of the imaginary equilateral triangle T so that the holes 50 of the upper plate 52 match the holes 40 of the base plate 28.

Located at the center C of the imaginary equilateral triangle T is a rubber plunger or actuation member 55 that protrudes from the bottom surface of the upper plate. When the switch unit 10 is activated, the rubber plunger or actuation member 55 engages and actuates the micro-switch 34 of the transmitter module 32. The actuator member 55 is preferably in the shape of a truncated cone. Other suitable shapes that allow the actuation member 55 to properly engage the micro-switch 34 may be employed. As mentioned above, the micro-switch 34 is also located at the center C of the imaginary equilateral triangle T and is normally biased into an open or inactive position. In addition to activating the micro-switch, the plunger or actuation member 55 also limits the downward travel of the upper plate 52.

Encircling each support post 44 is a spiral spring 56 that engages both the upper and base plates 52 and 28. Each of the holes 40 of the base plate 28 is provided with a relatively shallow counterbore 58 that functions as a spring seat for one end of a respective spiral spring 56. Likewise, on the bottom side of the upper plate 52, each of the holes 50 is provided with a relatively shallow counter bore 60 that functions as a spring seat for the opposing end of the respective spiral spring 56. When in position, the spiral springs 56 are compressed and, therefore, biased to push the upper plate 52 away from the base plate 28. The support posts 44 in conjunction with the bolt heads 46 limit the upward travel of the upper plate 52 and therefore ensure that the spiral springs remain compressed and biased against the upper plate 52.

The total force that the three springs 56 apply to the upper plate 52 is preferably equal to at least the combined weight of the upper plate 52, plunger 55, and outer shell 30 so that the springs 56 act with sufficient force to hold the plunger 55 spaced from the micro-switch 34 when the switch unit 30 is inactive. Preferably, the total force of the three springs 56 also includes a nominal amount to ensure that the switch unit 10 is not activated in error.

The operation of the chime system will now be described. When in use, the switch unit 10 is placed on the floor, ground, or platform in an area where a pet may be expected to use and reach the unit 10—for example, on the floor near a door. The chime unit 15 is plugged into an electrical outlet in a vicinity where the owner of the dog may expect to hear the chime 24 when the chime unit 15 is activated. To activate the switch unit 10, the dog, or other pet, uses its paw to apply pressure to the top of the outer shell 30. The shape and design of the outer shell 30 aids the dog in identifying where to press.

As the dog applies pressure to the top of the outer shell 30, the biasing force of the three springs 56 is overcome and the outer shell 30 along with the upper plate 52 are forced downward. As the upper plate 52 moves downward, the plunger or actuation member 55 moves downward, engages and depresses the micro-switch 34. The activated micro-switch 34 energizes the transmitter module circuit causing the transmitter 33 to generate and transmit by radio frequency a signal for the chime unit 15 to sound the chime 24. The chime unit 15 receives the signal and activates the chime 24.

When the dog releases the pressure to the outer shell 30, the springs 56 force the upper plate 52 and outer shell 30 upward and the plunger 55 out of engagement with the micro-switch 34. The-micro-switch 34 then returns to its open position, and the transmitter module circuit is de-energized. A signal is no longer transmitted to the chime unit 15, and the chime unit 15 stops sounding the chime 24.

Preferably, the transmitter module 32 and receiver module 15 are of the type that the receiver module 15 will not continue to sound the chime 24 so long as the micro-switch 34 is depressed. Rather, if the micro-switch 34 is continually depressed, the chime 24 will continue to sound only for a predetermined time, afterwhich the chime 24 will switch off.

As can be appreciated, the support posts 44, in addition to holding the springs 56 upright, help to guide the upper plate 52 as the upper plate 52 moves up and down. As explained above, the support posts 44 are preferably positioned at the vertices of the imaginary equilateral triangle T and the micro-switch 34 is positioned at the center C of the triangle T. This positioning of the support posts 44 and micro-switch 34 helps prevent non firing or false ruing of the transmitter module 32. Such nonfiring or false firing would be undesirable as it could delay or destroy the pet's ability to properly learn the activity.

FIGS. 6A, 6B, and 6C illustrate schematically the forces involved when different external pressures or no pressure is applied to the top of the outer shell 30. When no force or pressure is applied to the outer shell 30 as shown in FIG. 6A, the springs 56 act to push the upper plate 52 upward so that the plunger or actuation member 55 does not contact and depress the micro-switch 34. The support posts 44 with the bolt heads 46 limit the upward movement of the upper plate.

If the switch unit 10 is depressed near the center of the imaginary equilateral triangle T as illustrated in FIG. 6B, the upper plate 52 will move substantially equally down each of the support posts 44, and the plunger 55 will evenly depress the micro-switch 34. If, however, the switch unit 10 is depressed near the edge of the outer shell 30, as illustrated in FIG. 6C, the upper plate 52 will move down the support posts 44 unevenly. However, due to the arrangement of the support posts 44, the upper plate 52 will still move downward enough so that the plunger 55 engages and depresses the micro-switch 34. The support post 44 furthest away from the point of applied force will essentially act as a lever, thereby moving the plunger 55 in a downward direction. With three support posts 44 equally spaced apart, the lever action works evenly in three directions.

Preferably the top counter bores 54 in the upper plate 52 have a depth that is at least equal to the length of the bolt heads 46 plus the distance between the plunger 55 and the micro-switch 34 when the switch unit 10 is at rest. This way the bolt heads 46 will not hit the inside surface of the outer shell 30 and prevent the engagement of the plunger 55 and micro-switch 34 when the outer shell 30 is depressed. Preferably, the counterbores 54 have a little extra depth to serve as a safety margin.

While only one embodiment of the invention has been shown and described, it should be recognized that other variations, substitutions, or modifications will occur to those skilled in the art. Any such variations, substitutions, and modification are intended to fall within the scope of the invention as defined in the appended claims.

What is claimed is:

1. A pet-operable chime system, comprising:
   a switch unit comprising
      a base plate,
      a movable plate spaced from said base plate, said movable plate having at least one through hole,
      a transmitter for transmitting signals,
      a switch electrically coupled to said transmitter and mounted to either said base plate or said movable plate,
      an actuation member attached to the other of said base plate or said movable plate that does not support said switch, said actuation member being postitioned at a location that is substantially opposite said switch,
      at least one spring interconnecting said movable plate and said base plate, wherein said at least one spring is biased to push said movable plate away from said base plate, and
      at least one post interconnecting said movable plate and said base plate, said post having a first end and an opposing second end, wherein said first end of said post is fixed to said base plate, and said second end of said post is freely inserted through said at least one hole of said movable plate such that said movable plate is free to slide along said post; and a remote chime unit comprising
      a receiver for receiving signals from said transmitter, and
      a chime electrically coupled to said receiver for generating an audible sound;
   wherein said movable plate is movable between a neutral position where no pressure is applied to said movable plate and said actuation member does not engage said switch and an activated position where under pressure said movable plate is moved toward said base plate against the bias of said at least one spring such that said actuation member engages and activates said switch, said activated switch causing said transmitter to send a signal to said remote chime unit to sound said chime.

2. A pet-operable chime system according to claim 1, wherein said at least one spring is a spiral spring that encircles said at least one post.

3. A pet-operable chime system according to claim 1, wherein said second end of said post is provided with a bolt head that is wider in diameter than said post near said second end, and wherein over a first portion of said hole of said movable plate the diameter of said hole is slightly larger than the diameter of said post and over a second portion of said hole the diameter of said hole is slightly larger than said bolt head such that said second portion of said hole accommodates said bolt head.

4. A pet-operable chime system according to claim 1, wherein said switch unit has three said posts interconnecting said movable plate and said base plate and has three said springs interconnecting said movable plate and said base plate, and wherein said movable plate has three said through holes for receiving respective second ends of said posts.

5. A pet-operable chime system according to claim 4, wherein said three springs are spiral springs that encircle respective ones of said three posts so that there are three pairs of springs and posts, and wherein each spring and post pair is substantially aligned with a respective vertex of an imaginary equilateral triangle such that each post and spring pair is substantially an equal distance from each of the other two post and spring pairs.

6. A pet-operable chime system according to claim 5, wherein said switch and said actuation member are substantially aligned with the center of said equilateral triangle, said center of said equilateral triangle being located at the angle bisectors of the equilateral triangle.

7. A pet-operable chime system according to claim 1, wherein the exterior of said base plate is provided with nonskid pads to prevent the base plate from moving when positioned on the ground.

8. A pet-operable chime system according to claim 1, wherein said switch unit further comprises an outer shell that covers said movable plate and extends along the side of said switch unit.

9. A pet-operable chime system, comprising:
a portable switch unit comprising
a base stand,
a movable plate spaced from said base stand, said movable plate having at least one through hole,
a transmitter for transmitting signals,
a switch electrically coupled to said transmitter and mounted to either said base stand or said movable plate,
an actuation member attached to the other of said base stand or said movable plate that does not support said switch, said actuation member being postitioned at a location that is substantially opposite said switch,
at least one spring interconnecting said movable plate and said base stand, wherein said at least one spring is biased to push said movable plate away from said base stand, and
at least one post interconnecting said movable plate and said base stand, said post having a first end and an opposing second end, wherein said first end of said post is fixed to said base stand, and said second end of said post is freely inserted through said at least one hole of said movable plate such that said movable plate is free to slide along said post; and a remote chime unit comprising
a receiver for receiving signals from said transmitter, and
a chime electrically coupled to said receiver for generating an audible sound;
wherein said movable plate is movable between a neutral position where no pressure is applied to said movable plate and said actuation member does not engage said switch and an activated position where under pressure said movable plate is moved toward said base stand against the bias of said at least one spring such that said actuation member engages and activates said switch, said activated switch causing said transmitter to send a signal to said remote chime unit to sound said chime.

10. A pet-operable chime system according to claim 9, wherein said at least one spring is a spiral spring that encircles said at least one post.

11. A pet-operable chime system according to claim 9, wherein said second end of said post is provided with a bolt head that is wider in diameter than said post near said second end, and wherein over a first portion of said hole of said movable plate the diameter of said hole is slightly larger than the diameter of said post and over a second portion of said hole the diameter of said hole is slightly larger than said bolt head such that said second portion of said hole accommodates said bolt head.

12. A pet-operable chime system according to claim 9, wherein said switch unit has three said posts interconnecting said movable plate and said base stand and has three said springs interconnecting said movable plate and said base stand, and wherein said movable plate has three said through holes for receiving respective second ends of said posts.

13. A pet-operable chime system according to claim 12, wherein said three springs are spiral springs that encircle respective ones of said three posts so that there are three pairs of springs and posts, and wherein each spring and post pair is substantially aligned with a respective vertex of an imaginary equilateral triangle such that each post and spring pair is substantially an equal distance from each of the other two post and spring pairs.

14. A pet-operable chime system according to claim 13, wherein said switch and said actuation member are substantially aligned with the center of said equilateral triangle, said center of said equilateral triangle being located at the angle bisectors of the equilateral triangle.

15. A pet-operable chime system according to claim 9, wherein the exterior of said base stand is provided with nonskid pads to prevent the base stand from moving when positioned on the ground.

16. A pet-operable chime system according to claim 9, wherein said switch unit further comprises an outer shell that covers said movable plate and extends along the side of said switch unit.

17. A pet-operable chime system, comprising:
a portable switch unit comprising
a base stand,
a movable plate spaced from said base stand, said movable plate having three through hole,
a transmitter for transmitting radio frequency signals,
a switch electrically coupled to said transmitter and mounted to either said base stand or said movable plate,
an actuation member attached to the other of said base stand or said movable plate that does not support said switch, said actuation member being postitioned at a location that is substantially opposite said switch,
three posts interconnecting said movable plate and said base stand, each said post having a first end and an opposing second end that is provided with a bolt head that is wider in diameter than said post, wherein said first end of each said post is fixed to said base stand, and said second end of each said post is freely inserted through a respective one of said through holes of said movable plate such that said movable plate is free to slide along said posts, said through holes each have a first portion that is slightly larger than the diameter of said post and a second portion that is slightly larger than said bolt head and receives said bolt head, three spiral springs interconnecting said movable plate and said base stand, said springs being biased to push said movable plate away from said base stand, wherein each said spiral spring encircles a respective support post, and an outer shell that covers said movable plate and extends along the side of said switch unit; and a remote chime unit comprising a receiver for receiving signals from said transmitter, and a chime electrically coupled to said receiver for generating an audible sound;

wherein said movable plate is movable between a neutral position where no pressure is applied to said movable plate and said actuation member does not engage said switch and an activated position where pressure is applied to said outer shell and said movable plate such that said movable plate is moved toward said base stand against the bias of said springs and said actuation member engages and activates said switch, said activated switch causing said transmitter to send a signal to said remote chime unit to sound said chime.

* * * * *